April 7, 1970   J. E. HAMMONDS   3,505,142
MEANS AND METHOD FOR COPYING PRINTED MATERIAL
Filed May 25, 1966

*INVENTOR.*
John E. Hammonds
BY
Attorney

April 7, 1970 J. E. HAMMONDS 3,505,142
MEANS AND METHOD FOR COPYING PRINTED MATERIAL
Filed May 25, 1966 2 Sheets-Sheet 2

*INVENTOR.*
John E. Hammonds
BY
Attorney

United States Patent Office 3,505,142
Patented Apr. 7, 1970

3,505,142
MEANS AND METHOD FOR COPYING
PRINTED MATERIAL
John E. Hammonds, Bedford, Mass.
(5254 E. 20th St., Tucson, Ariz. 85711)
Filed May 25, 1966, Ser. No. 552,913
Int. Cl. B32b 31/12; B44c 1/24
U.S. Cl. 156—234                                        13 Claims

ABSTRACT OF THE DISCLOSURE

Copies of printed original papers are made by means of a transparent impression sheet coated with two layers of elastomeric film-forming material, a first layer bonded directly to the transparent sheet and a second layer containing a pigment bonded to the first layer. The adhesive bond strength between the inked and uninked areas of the printed paper to be copied is adjusted such that the film-forming material exhibits a differential adhesion between the inked and uninked areas. When the elastomeric material is contacted with the printed sheet and then peeled away, the pigment and a substantial amount of the elastomeric material is removed from the impression sheet in the areas exhibiting the greater adhesive bond strength.

---

This invention relates to a novel copying device and method, and more particularly to a device and method for copying indicia without the use of any mechanical equipment.

Over the recent past, considerable attention has been directed to the development and commercialization of machines and systems for duplicating and copying printed material. The systems now in use are based upon several different modes of operation. For example, one system is based upon the effecting of a chemical reaction, which gives rise to a colored end product. The reaction is initiated or effected by heat which is absorbed and transmitted by indicia on the original to be copied. Another system is based upon the electrostatic deposition of pigmented particles and the fixing of these pigmented particles through heat. Other systems depend upon the use of papers which have heat-sensitive or light-sensitive coatings, while yet others contain coatings having electrically-conducting particles such as zinc oxide.

All of the prior are systems require the use of relatively complicated and expensive equipment, and some of this equipment may be bulky. Thus, such copying processes as described are generally limited to being performed in localities where this equipment may be located and can not be made available in remote locations or where the demand is relatively low. This indicates the need for having available a relatively simple and inexpensive system for copying printed material at points remote from the location of copying equipment. Such a copying system would be particularly helpful where copies are only occasionally needed or where expensive equipment cannot be economically justified. The copying method and device of this invention provides a system for making copies of printed material remote from any complicated or bulky equipment and without their employment.

It is therefore a primary object of this invention to provide a device and method for copying printed material, the device and method being of such a character that no mechanical equipment is required. It is another object of this invention to provide such a device and method which are relatively inexpensive and which at the same time are capable of reproducing solids as well as finely-detailed halftones. It is yet another object of this invention to provide a system of the character described which is flexible in its ultimate application and which can be used to produce several duplicates from a single master copy by any one of several methods. It is yet another object of this invention to provide a system of the character described which does not require the use of any external developing or fixing materials. It is still another object of this invention to provide a copying device which is complete in itself and requires no additional components or equipment. Other objects of the invention will in part be obvious and will in part be apparent hereinafter.

The invention accordingly comprises the several steps and the relation of one or more of such steps with respect to each of the others, and the article possessing the features, properties, and the relation of elements, which are exemplified in the following detailed disclosure and the scope of the invention will be indicated in the claims.

The indicia which are to be copied by the practice of this invention are those which are in the form of ink deposited on a paper (or other) surface, e.g., printed matter and inked drawings. Ink and paper surfaces have different physical and chemical characteristics. By virtue of these different physical and chemical characteristics the overall surface of the printed matter exhibits a variation in adhesion to certain elastomeric materials deposited in essentially transparent film form. This variation can be thought of as representing a pattern in adhesion-nonadhesion with respect to the elastomeric film and can serve as a means for generating an impression of the printed matter by using elastomeric films which exhibit a marked differential in adhesion to the inked surface compared to the non-inked surfaces. Normally, it will be desirable to use an elastomeric film which exhibits a greater adhesive bond to the inked areas than to the non-inked areas.

In my copending application Ser. No. 552,914, filed on Apr. 25, 1966, I have described a method and means for using the difference in physical and chemical characteristics between the unprinted and the printed surfaces in conjunction with a novel method wherein an elastomeric film layer having no pigment associated therewith is brought into direct surface-to-surface contact with the printed material to be copied. The contact is then broken and in those areas where printed indicia contacted the elastomeric film, there is generated a pattern in the form of disrupted-undisrupted areas; the pattern appearing as opaque on a transparent background. The film surface may then be fixed, if desired; and in order to make a permanent copy, it is developed by the application of either a liquid developer such as ink or a powder developer such as carbon black. In either case, the developer is one which will adhere to the disrupted area but not to the undisrupted areas. A contrast-color substrate is then affixed to the elastomeric surface; and when the final assembly is viewed through the transparent substrate there appears a copy of the original, the color of the copy and background being dependent upon the color chosen for the developer and the contrast-color substrate.

By the method and means of this invention, the necessity for the use of a fixing film and developer is eliminated. This is accomplished by the deposition on top of the elastomeric film layer of a pigmented layer which may itself be of an elastomeric nature or be covered with a second elastomeric layer film. Contacting of this impression sheet with the original to be copied sets up in the impression sheet a pattern of disrupted-undisrupted areas. In the process of disrupting certain areas of the elastomeric material to form the pattern, the corresponding areas in the pigmented layer are likewise disrupted to the extent that the pigment is removed therefrom thus exposing the transparent substrate of the original copying assembly. By placing on the elastomeric film surface a contrast-color substrate, e.g., a piece of black paper, there results a copy of the original when the final assembly is viewed through the uncoated side of the transparent film substrate. There is therefore formed a copy of the original without the use of any external developer or fixing agent. The copy is literally contained between the original transparent substrate and the contrast-color substrate and thus is permanent and unalterable.

For a fuller understanding of the nature and objects of the invention, reference should be had to the following detailed description taken in connection with the accompanying drawings in which:

FIGS. 1–9 illustrate, somewhat in simplified cross-section, two embodiments of the method and device of this invention. It will be appreciated that no attempt has been made to draw these figures to scale and that thicknesses and other features have been considerably exaggerated better to illustrate the invention.

Figure 1:
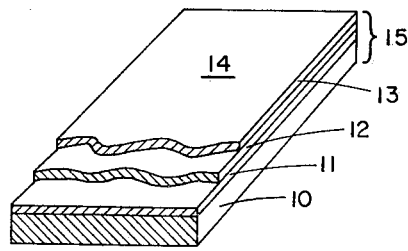
FIG. 1 is a partial cross-sectional view of one embodiment of the impression sheet assembly.

In FIG 1, there is shown in partial cross-section, an assembly 15 hereinafter referred to as the "impression sheet" comprising a transparent substrate 10 on which is coated an under elastomeric layer 11, a pigmented film layer 12, which may be elastomeric in nature, and an upper elastomeric layer 13, the latter of which presents an impression surface 14 for contact with the original to be copied.

Figure 2:
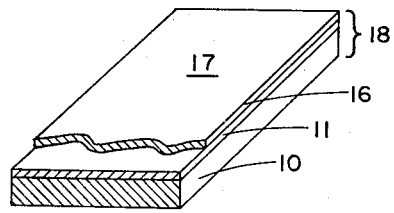
FIG. 2 is a partial cross-sectional view of another embodiment of the impression sheet assembly.

In FIG. 2, another embodiment of an impression sheet 18 is illustrated. In this embodiment, a single pigmented elastomeric layer 16 is used to replace the combination of the pigmented film layer 12 with the upper elastomeric layer 13 of the FIG. 1 embodiment. Such a pigmented elastomeric layer may contain suitable finely-divided, pigmented, particulate matter, e.g., titanium dioxide, incorporated directly into an elastomeric material rather than deposited as a separate layer as in the embodiment of FIG. 1. However, the method by which copies are made and the actual functioning of the impression sheet is, as will be seen below, identical for each of these modifications.

Figure 3:
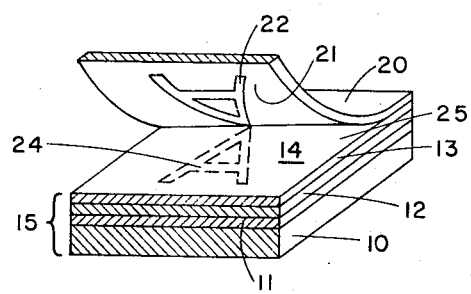
FIG. 3 illustrates, partially in cross-section, the contacting of the impression sheet with the printed material to be copied.
Figure 4:
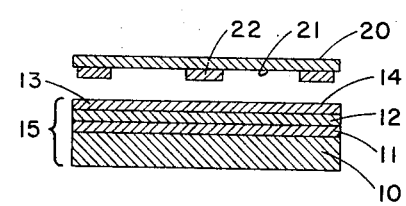
FIG. 4 is a detailed cross-section through the impression sheet and the original just prior to contact.
Figure 5:
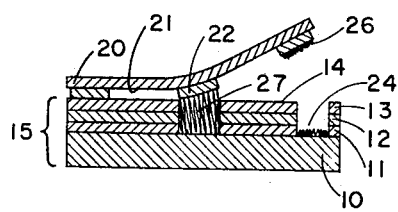
FIG. 5 is a detailed cross-section through the original and the impression sheet during the breaking of the contact.

Turning now to FIGS. 3–6, it will be seen how the patterns are created in the elastomeric film surface of the impression sheet 15. To make a copy, the printed original is brought into surface-to-surface contact with the impression sheet as shown in FIGS. 3 and 4. The printed original 20 can be thought to have two types of surfaces, namely, those areas 21 on which no printing occurs and those areas on which printing 22 occurs. This situation is somewhat exaggerated in the drawing in FIG. 4 and it will, of course, be appreciated that the uninked or uncovered surfaces 21 actually make contact with the elastomeric film surface 14; but the situation is illustrated in FIGS. 4 and 5 in this manner better to show the way in which the disrupted area patterns are created in the film surface.

The contacting of the printed original with the film surface 14 results in the establishment of an adhesive, somewhat elastic bond between the printed surfaces 22 and the film surface 14. This bond is greater than the bond between the unprinted surface 21 and the film surface 14 in the case illustrated in these figures. With the subsequent removal of the original 20 from the elastomeric film surface 14, the printed surfaces 22, because of the bonds which were set up, withdraw with them from the impression sheet a portion of the pigmented layer which corresponds directly in area pattern with the printed material 22 on the original 20. This is shown in FIG. 5 as a small quantity of residual pigmented material 26 adhering to the printed surface. This residual material may be readily removed by brushing it off. As the contact is broken, there is a certain elastic region 27 established between the elastomeric film surfaces and the surface of the print copied, and this is shown in FIG. 5 as a stretching of the elastomeric material. The result of the contact and its subsequent breaking is illustrated in FIG. 3 where it will be seen that there is formed on the surface 14 of the impression sheet 15 a pattern of disrupted area impressions 24 corresponding to the indicia to be copied and an undisrupted area 25 corresponding to that part of the original which did not contain printing. The mechanism is essentially the same for the impression sheet embodiment of FIG. 2.

Figure 6:
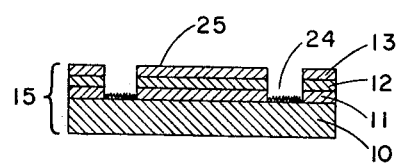
FIGS. 6 and 7 are fragmentary detailed cross-sectional drawings of the impression sheets of FIGS. 1 and 2 subsequent to the removal of the original being copied and showing the disrupted areas.
Figure 7:
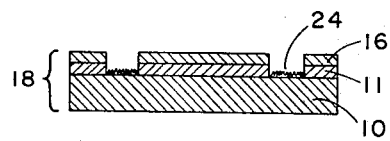

FIGS. 6 and 7 show fragmentary cross-sections of the resulting "exposed" impression sheets. There it will be seen how the impressions 24 have, in fact, withdrawn the pigmented material and the elastomeric films to the extent that the transparent original substrate 10 is exposed (probably to some small extent through the transparent under elastomeric film layer 11 if any remains) in a pattern corresponding now to a mirror image of the original indicia being copied. This pattern is the same whether it is formed through the 3-layer system of FIG. 6 or the 2-layer system of FIG. 7 which correspond directly to the impression sheet modifications of FIGS. 1 and 2, respectively.

Once the impressions are created in the impression sheet, there is produced a transparent mirror image in a white or pigmented background. In order to convert this to a true copy, it is necessary to affix thereto a contrast-color substrate 28 (FIG. 8) which has a properly-colored surface 29. For example, if the pigmented layer 12 contains titanium dioxide, the surface 29 of the contrast-color substrate may be black, thus giving a black-on-white copy when viewed as the final copy sheet oriented as in FIG. 9. Thus, the copy is seen through the uncoated side of the original transparent substrate 10 and where the original printed indicia has formed the impressions 24, the black surface 29 of the contrast-color substrate 28 will be visible to create in the final copy of black indicia on a white background.

Figure 8:
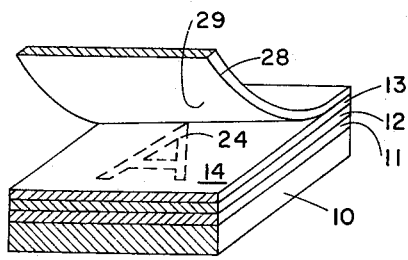
FIG. 8 is a partial cross-section of the completed copy showing the application of the contrast-color substrate.
Figure 9:
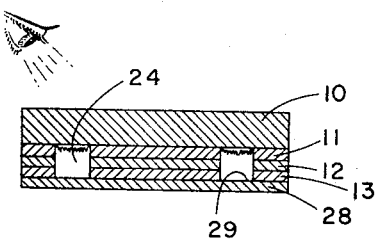
FIG. 9 is a fragmentary detailed cross-sectional representation of the completed copy showing the final assembly of the impression sheet with the contrast-color substrate.
Figure 10:
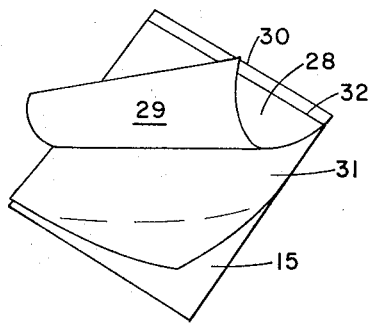
FIG. 10 illustrates one embodiment of a copy assembly using the method and components of this invention.

In the use of this copying method, the impression sheet and the contrast-color substrate may be handled as an assembly such as shown in FIG. 10. The impression sheet 15 (or 18 of FIG. 2) is bound along one edge 30 to a contrast-color substrate 28. For handling and shipping, it is desirable to place a readily removable release sheet 31 between the impression sheet 15 and the contrast-color substrate 28 since this will be assembled with the elastomeric tacky film facing the surface 29 of the constrast-color substrate. Many suitable release coatings are available for making the release sheet 31. In using the assembly of FIG. 10, it will only be necessary to fold back the contrast-color substrate 28 such as on fold line 32, remove the release sheet 31, and follow through the steps as discussed in connection with FIGS. 3–6. The step of FIG. 8 then requires only the folding back of the contrast-color substrate 28 into its original position and applying sufficient pressure to form the copy as shown in FIG. 8.

For the copy means and method of this invention, the original substrate 10 must be a transparent material which may or may not be flexible. For making copies in more or less sheet form, it will, of course, be desirable to use a flexible, transparent substrate such as any suitable thin, transparent, polymeric film. As examples, polyvinyl chloride, cellulose acetate, Mylar, cellulose triacetate, polysulfone and the like may be used. Such films are typically about 3 mils thick, although this is not critical. Where flexibility is not a consideration, then rigid, transparent substrates formed of such materals as polyacrylates, polyvinyl chloride or glass may serve as a suitable substrate.

It may be necessary in some cases to pretreat the surface of the substrate in order to effect a good bond between the surface and the elastomeric material. Such treatments are well known in the art. For example, synthetic resin surfaces may be treated with flash-dried casein. As another example, cellulose triacetate film may be treated with caustic solution. Such treatment will, of course, depend upon the surface of the substrate and the elastomeric material which is to be applied.

The elastomeric material or materials which are used to form the elastomeric layers of the impression sheet must exhibit a differential in adhesive bond strength between the inked and uninked areas of the surface of the original printed matter which is to be copied. This differential should be of a magnitude such that the greater of the adhesive bond strengths is sufficient to effect an impression, as described, in the surface of the elastomer film; while the lesser of the adhesive bond strengths is insufficient to effect such an impression on the surface of the elastomer film. The greater of the adhesive bond strengths must, however, be limited in its bond strength so that it is less than that which will effect any appreciable alteration of the surface structure of the original being copied. That is, if the adhesive bond strength of the elastomer films is greater for the inked areas, it must be somewhat less than the adhesive bond strength existing at the interface between the ink and the paper surface. If the adhesive bond strength of the films is greater for the uninked areas, it must be less than the bond which exists between the fibers forming the surface of the paper of the original printed matter. This is necessary since it is, of course, not desirable to remove the ink from the printed matter in the first case or to roughen the surface of the paper of the printed matter in the second case.

The physical properties of the elastomer films may be further described with reference to FIGS. 4 and 5, which cover the case where the elastomer film has a greater bond strength for the inked surfaces. As illustrated in FIGS. 4 and 5, it will be seen that subsequent to the contact of the impression sheet with the original to be copied the contact must be broken by pulling the two sheets apart. As pointed out in connection with the description of FIG. 4, the upper elastomer surface 13 or the pigmented elastomeric surfaces 16 actually makes contact with both the inked and uninked areas. (It may or may not, however, wet both surfaces—e.g., the intimacy of contact may not be equivalent in both cases.) Since the elastomer film exhibits a differential adhesive bond strength, it will separate readily from the uninked area 21 of the original 20 but will adhere temporarily to the inked surfaces 22. Since this contacting film is viscoelastic in character and has an adhesive bond strength for the inked areas, it is postulated that there will be a short period of time during the separation of the two sheets when the adherence between the elastomer film and the inked surfaces is sufficiently strong to stretch the elastomer surface (see FIG. 5) before contact is broken and the elastomer films, along with the pigmented layer, is pulled away from the transparent substrate 10, as shown on the right-hand side of FIG. 5.

As noted above, it is of course necessary that the adhesive bond strength of the elastomers be somewhat less with respect to the inked surface area than the adhesive bond strength between the inked indicia 22 and the paper 20 on which it is printed (see FIG. 4). If this is not the case, then in the process of separating the two sheets the elastomer film will take with it at least a portion of the ink from the original which is being copied and the pigment will not be withdrawn from the impression sheet.

If the greater adhesive bond strength exists between the elastomer film surface and the uninked surface of the original, then the process will, of course, be reversed with the disruption impressions being established in those areas in the elastomer film corresponding to the uninked surface areas of the original.

A large number of elastomer materials are available commercially which are suitable for the practice of this invention. Generally, these may be referred to as the synthetic rubbers. They include the styrene-butadiene rubbers (hot and cold polymerized, solvent polymerized and oil extended); the nitrile-butadiene rubbers and modified (e.g., carboxylated) nitrile-butadiene rubbers; the polyisobutylenes (molecular weights in the tens to hundred thousands); the modified polyisobutylenes such as those which contain a few mol percent of a diene such as isoprene or cyclopentadiene and the chloroprenes; the polyurethanes; the polyisoprene rubbers; the ethylenepropylene copolymer and terpolymer rubbers; and the polybutadienes. Among those elastomers which have been found to be particularly well suited for the practice of this invention are 1,4-polybutadiene (98% cis and 2% trans), polyisobutylene having a molecular weight in excess of about 100,000, and chlorobutyl rubber.

The purpose of the pigment in the pigmented layer 13 of FIG. 1 or 16 of FIG. 2 is to provide the background color for the final copy. Although this will normally be white, it does not, of course, have to be and any finely-divided solid material may be used as the pigment. For a white background, any of the well-known white pigments including, but not limited to titanium dioxide, zinc oxide and lead carbonate, may be used. Other well-known pigments may be used for different colors including carbon black, ferric oxide, cinnabar, ferric hydroxide, lead chromate, prussian blue, carmine, ochre and the like.

The pigment layer is preferably no thicker than that which is required to give the background of the final copy the desired degree of opacity and intensity of color. If it is to be incorporated between a lower and upper elastomeric film layer, as in the modification illustrated in FIG. 1, it may be dusted dry onto the surface of the lower elastomeric film layer 11 (FIGS. 1 and 2) or it may be mixed with a solution of the elastomeric film material and applied in this form to the lower elastomeric film layer. If the pigmented layer is to provide the contacting surface of the impression sheet, as in the modification of FIG. 2, then the pigment should be incorporated into an elastomeric film solution.

In applying the pigment dispersed in the solution of elastomer, the ratio of pigment to elastomer in the solution may vary widely, the optimum ratio depending upon the character of the pigment and the amount required to give the desired background color. Thus, the amount of the pigment may be as little as 25% the weight of total solids in the solution to as much as 90 or 95% by weight.

The elastomeric film coatings, including those containing pigments, are conveniently deposited upon the substrate from a solution in a suitable organic solvent such as hexane, the volatile hydrocarbons, whether aliphatic or aromatic, (e.g., toluene and xylene), and the oxygenated solvents such as ketones and ether. These latter are required for some of the acrylonitrile-butadienes which are generally not soluble in hydrocarbons. A preferred solvent, where usable, is hexane. The solvent is chosen with regard to the elastomeric material, as well as the substrate and pigment in the pigmented layer. Obviously, it can not be a liquid which is to any extent reactive with the substrate or the pigment. The concentrations of the solutions used will depend upon the elastomer, the solvent and the coating method employed.

Normally, such concentrations will range from a few (e.g., 2 or 3) percent to 20% solids by weight, with a normal range being between 8 to 10%. Above about 20%, many solutions become too viscous to work with. In the pigment-containing solutions, the same solids content ranges are applicable.

In applying the elastomer coating solutions or dispersions, any well-known technique may be used. Such techniques include, among others, the use of wire-wound rods, rolls, knife coaters, and the like.

The quantity of the elastomeric film coating on the substrate is not critical, although for practical reasons, it is desirable to keep it low to minimize cost and weight. Preferably, the total amount of elastomeric film coating, including the pigmented layer, should range between 0.1 pound and 4 pounds per thousand square feet of substrate surface.

The elastomeric film material may contain one or more modifiers to regulate its physical properties. For example, tackifiers may be added to increase tack, or a material such as calcium stearate may be added to decrease tack. In like manner, plasticizers and antioxidants and the like may also be incorporated into the elastomeric film.

The color of the contrast-color substrate determines the color of the indicia of the final copy, and it should offer a suitable contrast for the pigment which determines the color of the background. For normal copying, it is preferably black or near black; and if the pigment is white, there results a black-on-white copy.

If a release sheet such as sheet 31 of FIG. 10 is used, there are available a number of known release coatings which can be applied to that surface of sheet 31 which contacts the elastomeric film on the impression sheet 15. These release coatings must prevent any substantial migration of the elastomeric coating which would affect its impression-forming characteristics. Suitable release coatings on films include, but are not limited to, cellulose acetate, polypropylene and polyvinylidenechloride.

The device and means of this invention may be further described with reference to the following examples which are meant to be illustrative and not limiting.

EXAMPLE 1

A 3-mil transparent film of polysulfone was coated by means of a No. 40 wire-wound rod with an 8% by weight solution of 1,4-polybutadiene (98% cis and 2% trans) in hexane. After the solvent was removed by vaporization, the resulting elastomer, film layer was dusted with powdered titanium dioxide. The excess pigment was removed with light shaking, a second coat of the polybutadiene solution was applied, and the solvent removed by vaporization in a warm oven. The resulting impression sheet was contacted with a printed magazine page and then separated from it. A black tissue paper was used as a contrast-color substrate and pressed firmly to the "exposed" surface of the impression sheet. The resulting assembly, when viewed through the polysulfone substrate gave a sharp black copy of the original.

EXAMPLE 2

A polysulfone film was coated with a layer of polybutadiene as in Example 1. To a hexane solution of the polybutadiene (4% solids by weight) was added sufficient titanium dioxide to make a 10% total solids by weight solution and the titanium dioxide was thoroughly and uniformly mixed through. This pigmented solution was then applied to the surface of the polybutadiene film layer and the solvent removed. The resulting impression sheet used as in Example 1 to produce sharp black-on-white copies.

EXAMPLE 3

An impression sheet was formed as in Example 2. An upper film layer of the 8% solution of polybutadiene was applied. The resulting 4-layered impression sheet was used as in Example 1.

EXAMPLE 4

An impression sheet was made as in Example 2 except that carbon black was substituted for the titanium dioxide and a white tissue was used as the contrast-color substrate. The final assembly gave a sharp white-on-black copy.

EXAMPLE 5

Impression sheets were made as in Example 2 in which the polybutadiene was replaced with chlorobutyl rubber, polyisobutylene, a solution-polymerized styrene-butadiene rubber, an ethylene-propylene copolymer rubber, and acrylonitrile-butadiene rubber (in toluene). Zinc oxide, lead chromate, and prussian blue were used as pigments to give white, yellow and blue backgrounds, respectively.

EXAMPLE 6

A copy paper assembly such as shown in FIG. 10 was made by binding an impression sheet made as in Example 3 with a sheet of black tissue paper along one edge. A removable release sheet of cellulose acetate was interposed between them and removed before using as in Example 3.

The method and device of this invention provide a novel technique for making copies of printed matter without the use of complicated equipment. This is usable in copying halftones and large printed areas, for it presents no particular problems in handling these types of materials.

It will thus be seen that the objects set forth above, among those made apparent from the preceding description, are efficiently attained; and, since certain changes may be made in carrying out the above method and in the articles set forth without departing from the scope of the invention, it is intended that all matter contained in the above description (or shown in the accompanying drawings) shall be interpreted as illustrative and not in a limiting sense.

I claim:

1. An impression sheet suitable for generating impressions of an inked original and adapted to be affixed to a colored backing sheet to form a copy of said original comprising a transparent substrate having on one side thereof a coating comprising a first layer of an elastomeric film forming material, and a second layer of an elastomeric film-forming material on said first layer and having a pigment associated therewith, said elastomeric film-forming materials exhibiting a differential in adhesive bond strength between the inked and the uninked areas of the surface of said original, the differential being of a magnitude such that the greater of the adhesive bond strengths is sufficient to remove said pigment and at least a substantial amount of said elastomeric film-forming materials from said impression sheet, while the lesser of the adhesive bond strengths is insufficient to remove said pigment and said elastomeric materials from said impression sheet.

2. An impression sheet in accordance with claim 1 wherein said pigment is a separate layer interposed between said first and second layers of elastomeric film-forming material.

3. An impression sheet in accordance with claim 1 wherein said pigment is incorporated in said second layer of elastomeric material.

4. An impression sheet in accordance with claim 1 wherein said elastomeric film-forming materials exhibit a greater adhesive bond strength for said inked surfaces.

5. An impression sheet in accordance with claim 1 wherein said substrate is a flexible sheet material.

6. An impression sheet in accordance with claim 1 wherein said pigment is titanium dioxide.

7. An impression sheet in accordance with claim 1 wherein the total weight of said coating ranges between about 0.1 and 4 pounds per thousand square feet of substrate surface.

8. A copy assembly suitable for making a copy of an inked original, comprising in combination
(a) an impression sheet comprising a transparent substrate having on one side thereof a coating comprising
  (1) a first layer of an elastomeric film-forming material, and
  (2) a second layer of an elastomeric film-forming material on said first layer and having a pigment associated therewith; and
(b) a contrast-color substrate bound to one edge of said impression sheet,
said elastomeric film-forming materials exhibiting a differential in adhesive bond strength between the inked and the uninked areas of the surface of said original, the differential being of a magnitude such that the greater of the adhesive bond strengths is sufficient to remove said pigment and at least a substantial amount of said elastomeric film-forming materials from said impression sheet, while the lesser of the adhesive bond strengths is insufficient to remove said pigment and said elastomeric materials from said impression sheet.

9. A copy assembly in accordance with claim 8 further characterized by having a removable release sheet interposed between said impression sheet and said contrast-color substrate.

10. A copy assembly in accordance with claim 8 wherein said pigment is titanium dioxide and said contrast-color substrate is black whereby said copy constitutes black indicia on a white background.

11. A copy assembly in accordance with claim 8 wherein said elastomeric film-forming materials exhibit a greater adhesive bond strength for said inked surfaces.

12. A method of making a copy of an original having inked indicia thereon, comprising the steps of
(a) contacting the surface of said original with an impression sheet which comprises a transparent substrate having on one surface thereof a coating comprising a first layer of an elastomeric film-forming material and a second layer of an elastomeric film-forming material having a pigment associated therewith, said elastomeric film-forming materials exhibiting a differential in adhesive bond strength between the inked and the uninked areas of the surface of said original, the differential being of a magnitude such that the greater of the adhesive bond strengths is sufficient to remove said pigment and at least a substantial amount of said elastomeric film-forming materials from said impression sheet, while the lesser of the adhesive bond strengths is insufficient to remove said pigment and said elastomeric materials from said impression sheet;
(b) separating said impression sheet from the surface contact with said original whereby there is generated in said coating an image of said indicia; and
(c) affixing to said coating a substrate of a color contrasting with the color of said pigment.

13. A method in accordance with claim 12 wherein said elastomeric film-forming materials exhibit a greater adhesive bond strength for said inked surface and said image generated in said coating constitutes essentially transparent areas wherein said substrate is exposed.

References Cited

UNITED STATES PATENTS

| | | | |
|---|---|---|---|
| 3,294,612 | 12/1966 | Pail et al. | 156—236 X |
| 3,311,521 | 3/1967 | Hofrichter | 156—234 |
| 3,376,182 | 4/1968 | Borell et al. | 156—236 |

HAROLD ANSHER, Primary Examiner

T. SAVOIE, Assistant Examiner

U.S. Cl. X.R.

101—401.1; 156—235, 240, 249; 161—255